(12) United States Patent
Jeong et al.

(10) Patent No.: US 9,484,806 B2
(45) Date of Patent: Nov. 1, 2016

(54) DRIVING APPARATUS FOR DRIVING POWER FACTOR CORRECTION CIRCUIT

(71) Applicant: SAMSUNG ELECTRO-MECHANICS CO., LTD., Suwon, Gyunggi-do (KR)

(72) Inventors: In Wha Jeong, Gyunggi-do (KR); Chang Jae Heo, Gyunggi-do (KR); Bum Seok Suh, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 34 days.

(21) Appl. No.: 13/838,333

(22) Filed: Mar. 15, 2013

(65) Prior Publication Data
US 2014/0184175 A1    Jul. 3, 2014

(30) Foreign Application Priority Data

Dec. 27, 2012    (KR) .................. 10-2012-0155300

(51) Int. Cl.
*H02M 1/42* (2007.01)
*H02M 3/158* (2006.01)

(52) U.S. Cl.
CPC ........... *H02M 1/4225* (2013.01); *H02M 3/158* (2013.01); *Y02B 70/126* (2013.01)

(58) Field of Classification Search
None
See application file for complete search history.

(56) References Cited

U.S. PATENT DOCUMENTS

| | | | |
|---|---|---|---|
| 5,638,017 A | 6/1997 | Kim | |
| 6,690,589 B2* | 2/2004 | Barnett et al. | 363/72 |
| 7,130,202 B2* | 10/2006 | Yang | 363/44 |
| 7,518,895 B2* | 4/2009 | Shekhawat | H02M 1/34 363/127 |
| 8,482,948 B2 | 7/2013 | Chen | |
| 2010/0097041 A1* | 4/2010 | Ayukawa et al. | 323/272 |
| 2010/0097828 A1* | 4/2010 | Chen | 363/72 |

FOREIGN PATENT DOCUMENTS

| | | |
|---|---|---|
| CN | 1317865 A | 10/2001 |
| CN | 101728953 A | 6/2010 |
| KR | 1997-0008876 A | 2/1997 |
| KR | 2008-0047158 A | 5/2008 |

OTHER PUBLICATIONS

Office Action issued on Nov. 2, 2015 in the related Chinese Patent Application No. 2013101164822 (English Translation provided).

* cited by examiner

*Primary Examiner* — Timothy J Dole
*Assistant Examiner* — Monica Mata
(74) *Attorney, Agent, or Firm* — McDermott Will & Emery LLP

(57) ABSTRACT

There is provided a driving apparatus for driving an interleaved power factor correction circuit including a first main switch and a second main switch performing a switching operation with a predetermined phase difference and a first auxiliary switch and a second auxiliary switch forming a transformation path for surplus power existing before an ON operation of the first main switch and a second main switch, respectively, including: an input unit obtaining an input signal; a current sensing unit obtaining information regarding a current of the interleaved power factor correction circuit; and an output unit outputting a first control signal with respect to the first main switch, a third control signal with respect to the second main switch, a second control signal with respect to the first auxiliary switch, and a fourth control signal with respect to the second auxiliary switch, based on the input signal and the current information.

13 Claims, 15 Drawing Sheets

DRIVING APPARATUS FOR DRIVING POWER FACTOR CORRECTION CIRCUIT

CROSS-REFERENCE TO RELATED APPLICATIONS

This application claims the priority of Korean Patent Application No. 10-2012-0155300 filed on Dec. 27, 2012, in the Korean Intellectual Property Office, the disclosure of which is incorporated herein by reference.

BACKGROUND OF THE INVENTION

1. Field of the Invention

The present invention relates to a driving apparatus for driving an interleaved power factor correction circuit, devised for reducing switching loss.

2. Description of the Related Art

Recently, national governments around the world have urged the effective use of energy in conformity with energy efficiency policies, and in particular, the effective use of energy in electronic products or home appliances is widely recommended.

Thus, according to such recommendations, a remedial circuit for effectively using energy has been applied to power supply devices supplying power to electronic products, home appliances, and the like.

The remedial circuit may be, for example, a power factor correction circuit. A power factor correction circuit is a circuit for switching input power to adjust a phase difference (power factor) between a current and a voltage of the input power to effectively transfer power to a rear stage.

In general, a power factor correction circuit may be classified as a passive-type power factor correction circuit or an active-type power factor correction circuit.

A passive-type power factor correction circuit employs a method for correcting a power factor with an inductor or a capacitor, and in particular, it is known to have a limitation in power factor correction in a single phase.

An active-type power factor correction circuit employs a method of correcting a power factor by performing switching by a combination of an inductor and a switching element by using boost type topology. However, the active-type power factor correction circuit has relatively low efficiency, high internal currents, voltage ripples, electromagnetic interference (EMI) noise, and the like, and thus, an application thereof to a middle or large-scale power source device may be problematic.

In particular, in the case of an active-type power factor correction circuit, switching loss is generated in the process of switching input power.

Thus, a power factor correction circuit improving switching efficiency is required to be introduced, and the necessity for a driving apparatus for driving the power factor correction circuit is increasing.

Patent document 1 below relates to a pulse width control circuit, without disclosing a technique for driving a circuit having improved switching efficiency in the event of power conversion.

RELATED ART DOCUMENT (Patent document 1) Korean Patent Laid Open Publication No. 2008-0047158

SUMMARY OF THE INVENTION

An aspect of the present invention provides an apparatus for driving an interleaved power factor correction circuit capable of reducing switching loss generated in the event of power factor correction switching by transferring surplus power to the ground before a switching operation is performed to correct a power factor.

Another aspect of the present invention provides an apparatus for driving an interleaved power factor correction circuit capable of reducing an electromagnetic interference (EMI) noise level.

According to an aspect of the present invention, there is provided a driving apparatus for driving an interleaved power factor correction circuit including a first main switch and a second main switch performing a switching operation with a predetermined phase difference and a first auxiliary switch and a second auxiliary switch forming a transformation path for surplus power existing before an ON operation of the first main switch and the second main switch, respectively, including: an input unit obtaining an input signal; a current sensing unit obtaining information regarding a current of the interleaved power factor correction circuit; and an output unit outputting a first control signal with respect to the first main switch, a third control signal with respect to the second main switch, a second control signal with respect to the first auxiliary switch, and a fourth control signal with respect to the second auxiliary switch, based on the input signal and the current information.

The driving apparatus may further include: a signal separation unit outputting a first internal signal, the same as the input signal, and a second internal signal having a phase delayed, relative to the first internal signal, based on the input signal.

The driving apparatus may further include: a pulse width information obtaining unit obtaining pulse width information based on the current information and the input signal.

The driving apparatus may further include: an output waveform generation unit generating a third internal signal with respect to the first main switch, a fourth internal signal with respect to the first auxiliary switch, a fifth internal signal with respect to the second main switch, and a sixth internal signal with respect to the second auxiliary switch, based on the first internal signal, the second internal signal, and the pulse width information.

The output waveform generation unit may include a first output waveform generation unit generating the third internal signal and the fourth internal signal based on the first internal signal and the pulse width information; and a second output waveform generation unit generating the fifth internal signal and the sixth internal signal based on the second internal signal and the pulse width information.

The output unit may regulate an output level of the third internal signal, the fourth internal signal, the fifth internal signal, and the sixth internal signal.

The output unit may include: a first output unit regulating a level of the third internal signal to output a first control signal; a second output unit regulating a level of the fourth internal signal to output a second control signal; a third output unit regulating a level of the fifth internal signal to output a third control signal; and a fourth output unit regulating a level of the sixth internal signal to output a fourth control signal.

The input signal may be a pulse width modulation (PWM) signal.

The signal separation unit may include a phase retardation unit retarding the input signal.

The phase retardation unit may include a plurality of inverter elements connected in series.

The pulse width information obtaining unit may obtain a load current of the power factor correction circuit, generate a ramp signal based on the input signal, and obtain pulse width information based on the load current and the ramp signal.

According to another aspect of the present invention, there is provided a driving apparatus for driving an interleaved power factor correction circuit including a first main switch and a second main switch performing a switching operation with a predetermined phase difference and a first auxiliary switch and a second auxiliary switch forming a transformation path for surplus power existing before an ON operation of the first main switch and the second main switch, respectively, including: an input unit obtaining a first input signal and a second input signal; a current sensing unit obtaining information regarding a current of the interleaved power factor correction circuit; and an output unit outputting a first control signal with respect to the first main switch, a third control signal with respect to the second main switch, a second control signal with respect to the first auxiliary switch, and a fourth control signal with respect to the second auxiliary switch, based on the first input signal, the second input signal, and the current information.

The driving apparatus may further include: a signal input unit regulating the first input signal and the second input signal to have an internal control signal level.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
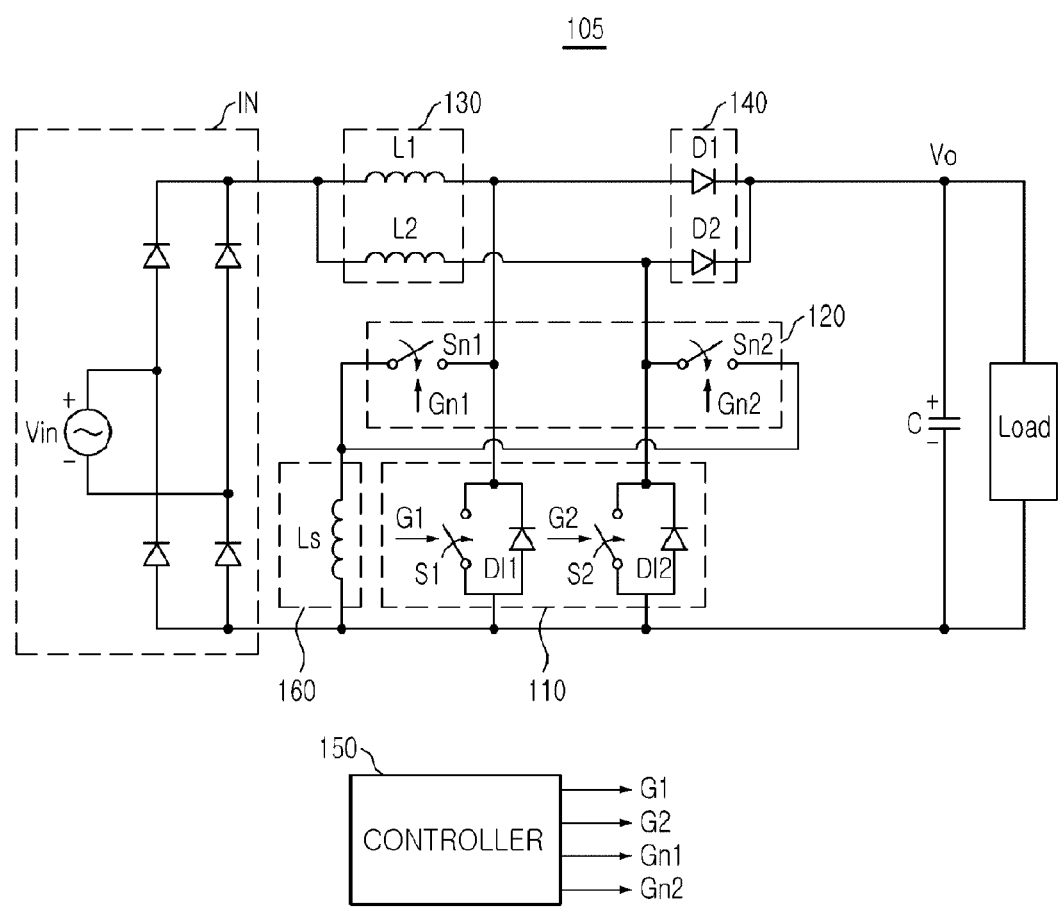
FIGS. 1 and 2 are schematic circuit diagrams of a power factor correction circuit according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
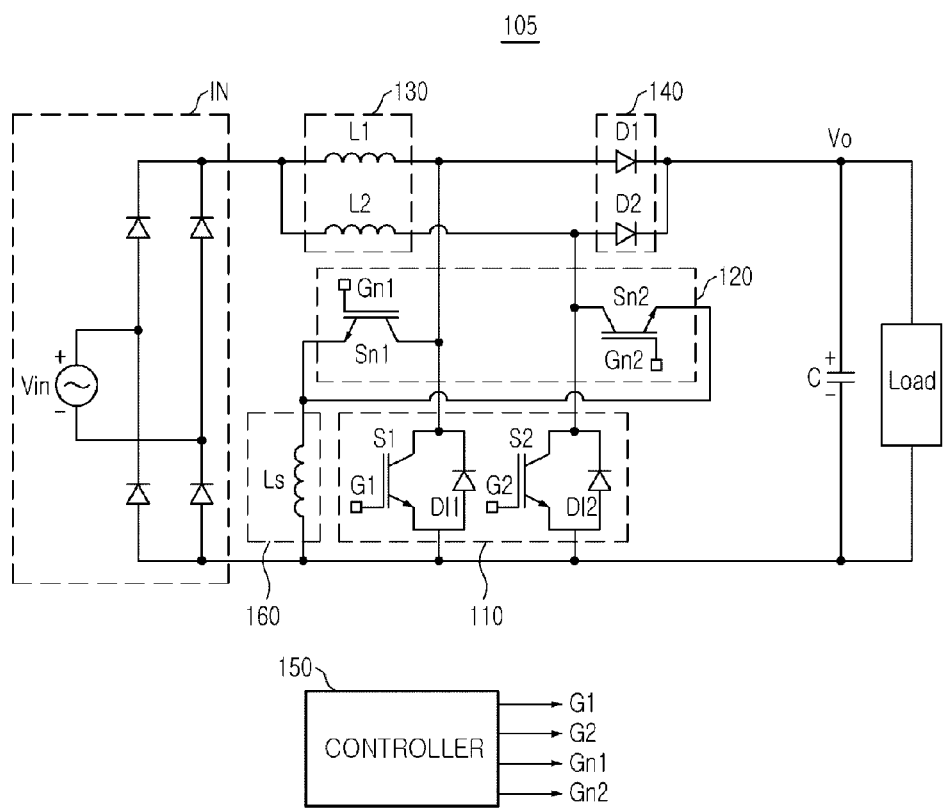

FIGS. 1 and 2 are schematic circuit diagrams of a power factor correction circuit according to an embodiment of the present invention;

Referring to FIG. 1, a power factor correction circuit 105 may include a main switching unit 110, an auxiliary switching unit 120, an inductor unit 130, an auxiliary inductor unit 160, a diode unit 140, a capacitor C, and a controller 150.

The main switching unit 110 may include a first main switch S1 and a second main switch S2 performing a switching operation with a predetermined phase difference to improve a power factor of input power. For example, the first main switch S1 and the second main switch S2 may perform a switching operation with a phase difference of 180° one another. Here, input power may be rectified power.

Also, the main switching unit 110 may include a first reverse current preventing diode DI1 and a second reverse current preventing diode DI2. The first reverse current preventing diode DI1 may prevent a reverse current of the first main switch S1. The second reverse current preventing diode DI2 may prevent a reverse current of the second main switch S2.

The first reverse current preventing diode DI1 and the second reverse current preventing diode DI2 may be diodes formed in a body when the first main switch S1 and the second main switch S2 are configured as transistors, but the present invention is not limited thereto and the first reverse current preventing diode DI1 and the second reverse current preventing diode DI2 may be separately added diodes.

The inductor unit 130 may be connected between an input power source terminal IN from which input power is applied and the main switching unit 110 to accumulate or discharge energy according to a switching operation of the main switching unit 110. In detail, the inductor unit 130 may include a first inductor L1 and a second inductor L2. The first inductor L1 may be connected between the input power source terminal IN and the first main switch S1. The second inductor L2 may be connected between the input power source terminal IN and the second main switch S2.

The diode unit 140 may provide a transmission path for power discharged from the inductor unit 130 according to a switching operation of the main switching unit 110. In detail, the diode unit 140 may include a first diode D1 and a second diode D2. The first diode D1 may provide a transmission path for power discharged from the first inductor L1 according to a switching operation of the first main switch S1. Also, the second diode D2 may provide a transmission path for power discharged from the second inductor L2 according to a switching operation of the second main switch S2.

The capacitor C may be connected to an output terminal in parallel to stabilize power output from the diode unit 140.

The auxiliary switching unit 120 may include a first auxiliary switch Sn1 and a second auxiliary switch Sn2. The first auxiliary switch Sn1 may be connected to the first main switch S1 in parallel. The second auxiliary switch Sn2 may be connected to the second main switch S2 in parallel.

The auxiliary inductor unit 160 may regulate an amount of current flowing in the auxiliary switching unit 120 in the event of a switching operation of the auxiliary switching unit 120.

The controller 150 may provide switching control signals G1, G2, Gn1, and Gn2 for controlling switching operations of the first main switch S1, the second main switch S2, the first auxiliary switch Sn1, and the second auxiliary switch Sn2.

The first main switch S1, the second main switch S2, the first auxiliary switch Sn1, and the second auxiliary switch Sn2 may be configured as one of an insulated gate bipolar transistor (IGBT), a metal oxide semiconductor field-effect transistor (MOS-FET), and a bipolar junction transistor (BJT), respectively. Referring to FIG. 2, it is illustrated that the first main switch S1, the second main switch S2, the first auxiliary switch Sn1, and the second auxiliary switch Sn2 are configured as BJTs, but the present invention is not limited thereto.

The main switching unit 110 of the power factor correction device 105 may perform a switching operation to adjust a phase difference between a voltage and a current of input power, to thus improve a power factor. Here, the auxiliary switching unit 120 may form a transmission path for surplus power remaining in the switching operation of the main switching unit 110.

Figure 3:
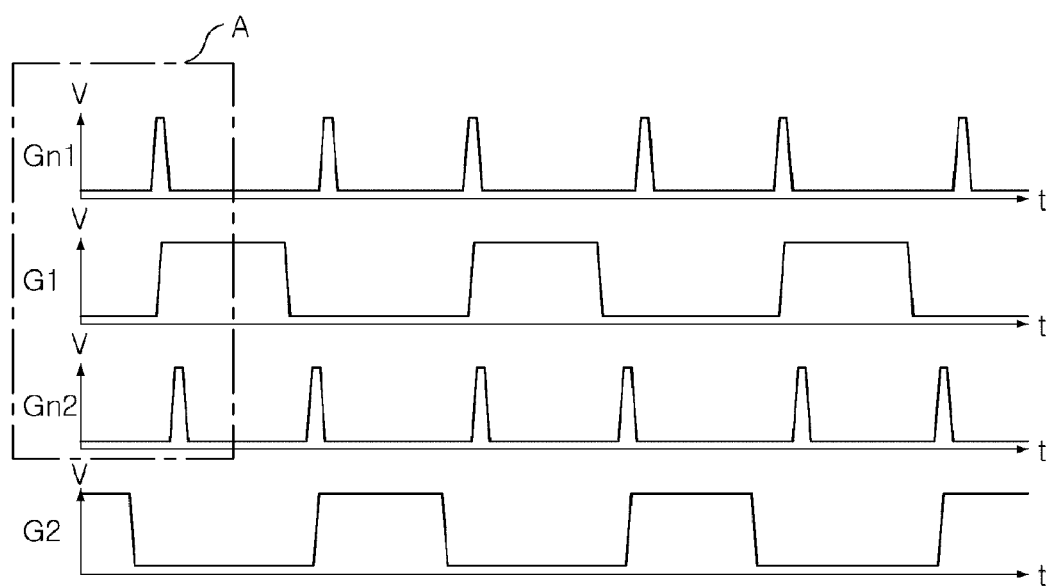
FIG. 3 is a graph showing switching control signals of a main switching unit and an auxiliary switching unit employed in the power factor correction circuit according to an embodiment of the present invention.
Figure 4:
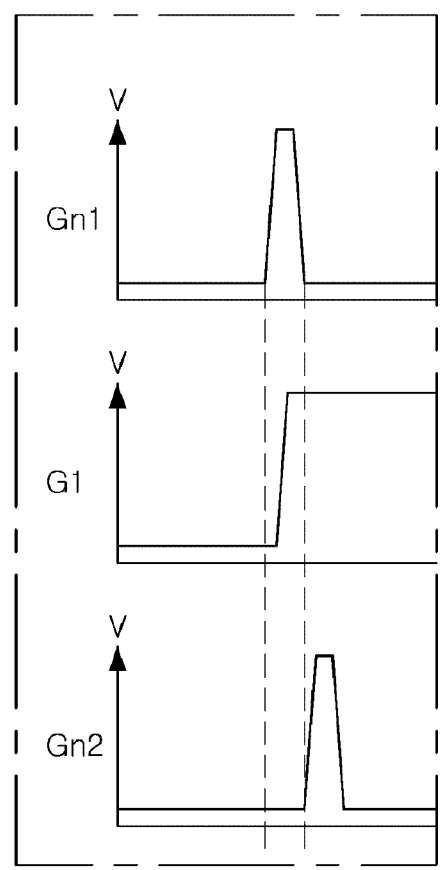
FIG. 4 is a graph showing portion 'A' of FIG. 3 enlarged.

FIG. 3 is a graph showing switching control signals of the main switching unit 110 and the auxiliary switching unit 120 employed in the power factor correction circuit according to an embodiment of the present invention, and FIG. 4 is a graph showing portion 'A' of FIG. 3 enlarged.

Referring to FIGS. 1, 3, and 4, the auxiliary switching unit 120 of the power factor correction circuit 105 may form a transmission path for surplus power before an ON operation of the main switching unit 110 (i.e., before the main switching unit 110 is turned on). Namely, in other words, by providing zero voltage switching conditions to the main switching unit 110, switching loss may be removed.

In detail, in order to form a transmission path for surplus power, the controller 150 may transmit switching control signals G1, G2, Gn1, and Gn2 for turning on the auxiliary switching unit 120 before an ON operation of the main switching unit 110. When the switching control signals are high level signals, the respective switches S1, S2, Sn1, and Sn2 may be turned on, and when the switching control signals are low level signals, the respective switches S1, S2, Sn1, and Sn2 may be turned off.

In detail, the first auxiliary switch Sn1 may form a transmission path for surplus power existing before an ON operation of the first main switch S1, and the second auxiliary switch Sn2 may form a transmission path for surplus power existing before an ON operation of the second main switch S2.

To this end, as illustrated in FIGS. 3 and 4, the first auxiliary switch Sn1 may be turned on before the first main switch S1 is turned on, and may be turned off before the first main switch S1 is turned off. This may be known as a first switching operation.

Also, the second auxiliary switch Sn2 may be turned on before the second main switch S2 is turned on, and turned off before the main switch S2 is turned off. This may be known as a second switching operation.

Here, ON operation intervals of the first switching operation and the second switching operation may be set to be equal.

Meanwhile, although the auxiliary switching unit 120 forms a transmission path for surplus power of the main switching unit 110 to reduce switching loss in the main switching unit 110, switching loss may be generated in the auxiliary switching unit 120.

In other words, at the timing of an OFF operation of the auxiliary switching unit 120, a peak voltage according to transient power may be generated from both ends of the auxiliary switching unit 120 to potentially cause switching loss.

In order to solve the problem, referring to FIG. 1, the power factor correction circuit may further include the auxiliary inductor unit 160 regulating an amount of current flowing in the auxiliary switching unit 120 in the event of a switching operation of the auxiliary switching unit 120. In FIG. 1, a single auxiliary inductor Ls is configured to be connected between a connection node of the first auxiliary switch Sn1 and the second auxiliary switch Sn2 and the ground, but the present invention is not limited thereto and two auxiliary inductors may be configured and one may be connected between the first auxiliary switch Sn1 and the ground and the other may be connected between the second auxiliary switch Sn2 and the ground.

Figure 5A:
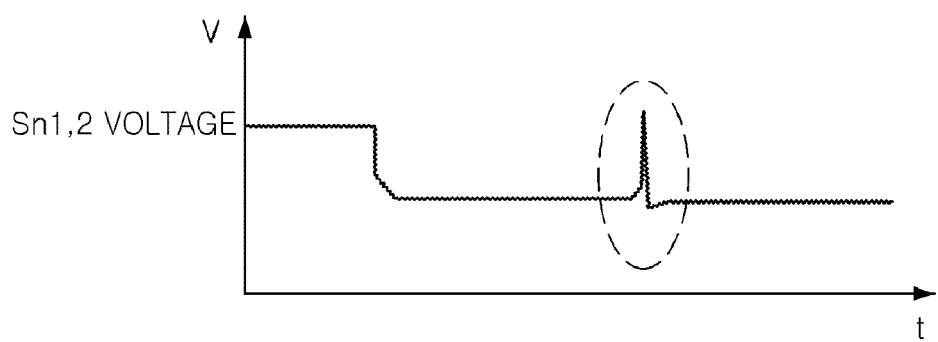
FIGS. 5A and 5B are graphs showing voltages generated from both ends of an auxiliary switching unit employed in the power factor correction circuit according to an embodiment of the present invention.
Figure 5B:
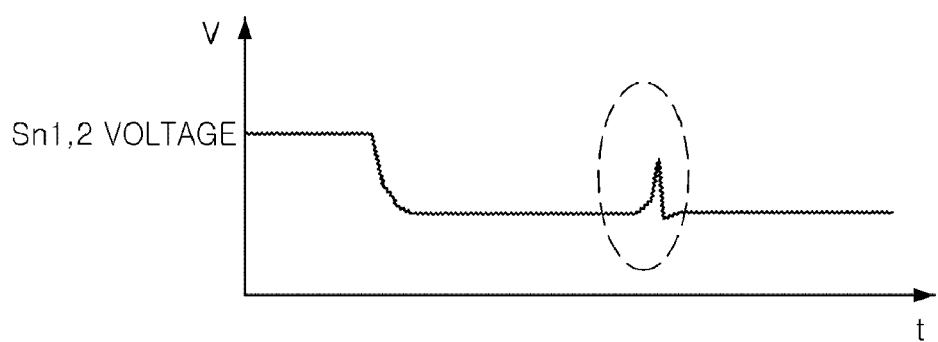

FIGS. 5A and 5B are graphs showing voltages generated from both ends of the auxiliary switching unit 120 employed in the power factor correction circuit according to an embodiment of the present invention. FIG. 5A is a graph showing a voltage generated from both ends of the auxiliary switching unit 120 when the power factor correction circuit according to an embodiment of the present invention employs an inductor. In FIG. 5A, the portion indicated by the dotted line shows a peak voltage generated when the first auxiliary switch Sn1 and the second auxiliary switch Sn2 perform a first switching operation and a second switching operation, respectively.

In order to reduce such a peak voltage, referring to FIG. 3, the first auxiliary switch may perform a switching operation in order to form a transmission path for transient power applied to the second auxiliary switch Sn2 when the second switching operation is terminated. Since the first auxiliary switch Sn1 performs a switching operation at the time the second switching operation of the second auxiliary switch Sn2 is terminated, forming a freewheeling path, so the second auxiliary switch Sn2 may perform a soft turn-off operation. In the case in which the first auxiliary switch Sn1 performs a switching operation at the time the second switching operation of the second switch is terminated, a freewheeling path Sn2-Ls-Dl1-Sn1-Ls is formed, and when the second auxiliary switch Sn2 performs a switching operation at the time the first switching operation of the first auxiliary switch Sn1 is terminated, a freewheeling path Sn1-Ls-Dl2-Sn2-Ls is formed.

Here, switching operations of the first auxiliary switch Sn1 and the second auxiliary switch Sn2 in order to form the freewheeling path may be set to be equal to the ON operation intervals of the second switching operation and the first switching operation, respectively.

FIG. 5B is a graph showing a voltage generated from both ends of the auxiliary switching unit 120 when the power factor correction circuit according to an embodiment of the present invention has a freewheeling path. It can be seen that the peak voltage is reduced, relative to that of FIG. 5A.

Figure 6:
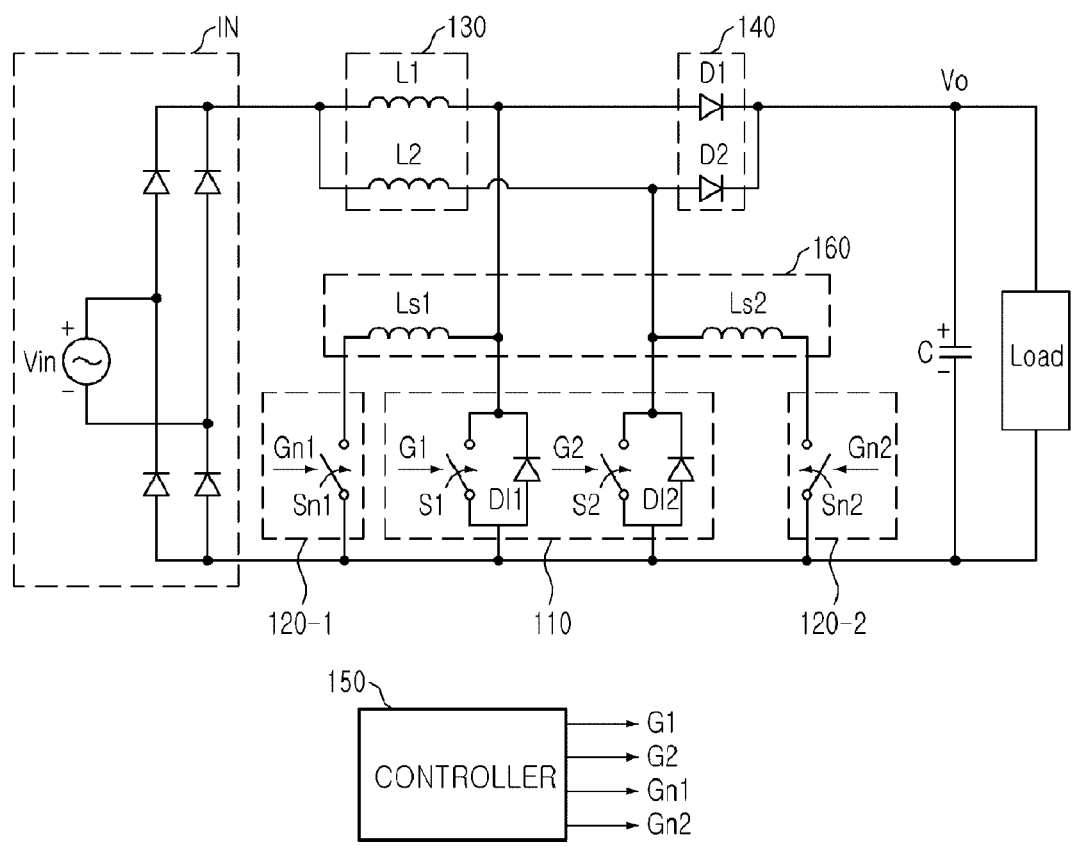
FIGS. 6 and 7 are schematic circuit diagrams of a power factor correction circuit according to another embodiment of the present invention.
Figure 7:
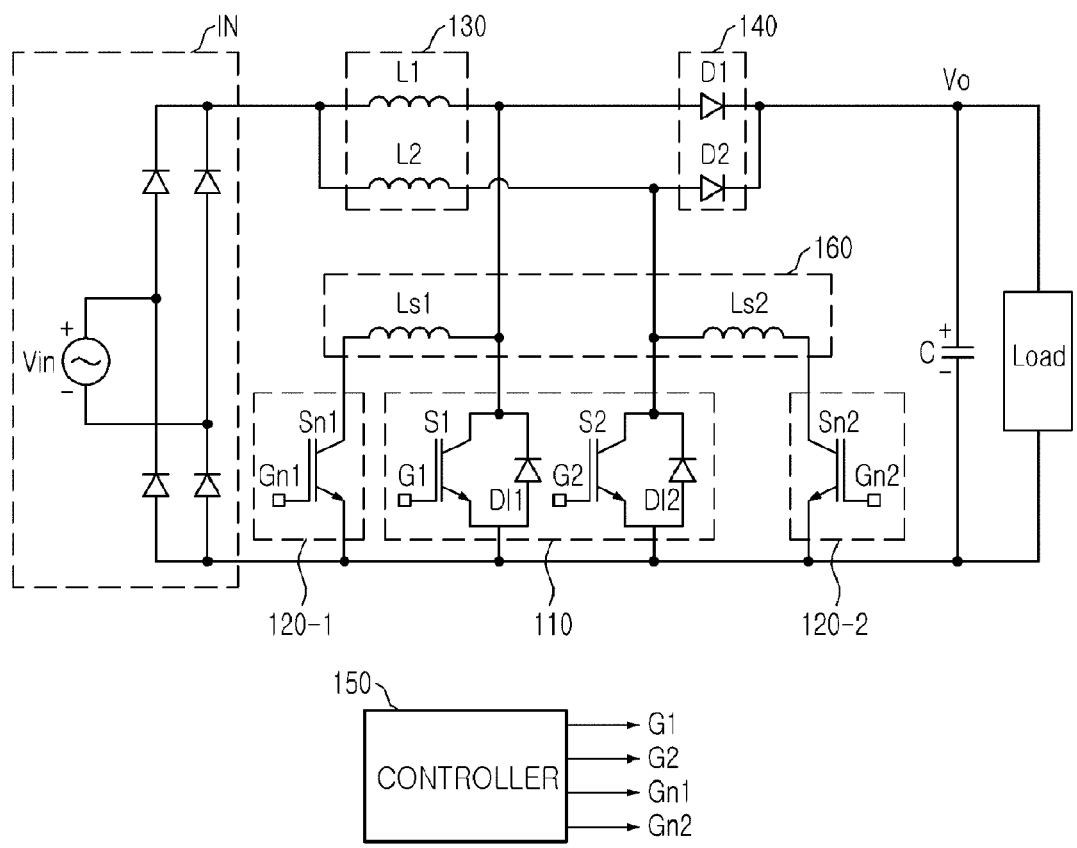

FIGS. 6 and 7 are schematic circuit diagrams of a power factor correction circuit according to another embodiment of the present invention The power factor correction circuit 105 illustrated in FIGS. 6 and 7 are similar to the power factor correction circuit 105 illustrated in FIG. 1, so a detailed description thereof will be omitted.

However, in the present embodiment, the auxiliary inductor unit 160 may include a first auxiliary inductor Ls1 and a second auxiliary inductor Ls2. Here, the first auxiliary inductor Ls1 may be connected between the first main switch S1 and the first auxiliary switch Sn1. The second auxiliary inductor Ls2 may be connected between the second main switch S2 and the second auxiliary switch Sn2.

The first main switch S1, the second main switch S2, the first auxiliary switch Sn1, and the second auxiliary switch Sn2 may be configured as one of an insulated gate bipolar transistor (IGBT), a metal oxide semiconductor field-effect transistor (MOS-FET), and a bipolar junction transistor (BJT), respectively. Referring to FIG. 7, it is illustrated that the first main switch S1, the second main switch S2, the first auxiliary switch Sn1, and the second auxiliary switch Sn2 are configured as BJTs, but the present invention is not limited thereto.

Meanwhile, the power factor correction circuit 105 according to an embodiment of the present invention is implemented in a two-phase interleaved scheme. Thus, even when one phase power factor circuit fails, an output may be continuously supplied through the other phase power factor correction circuit.

Figure 8:
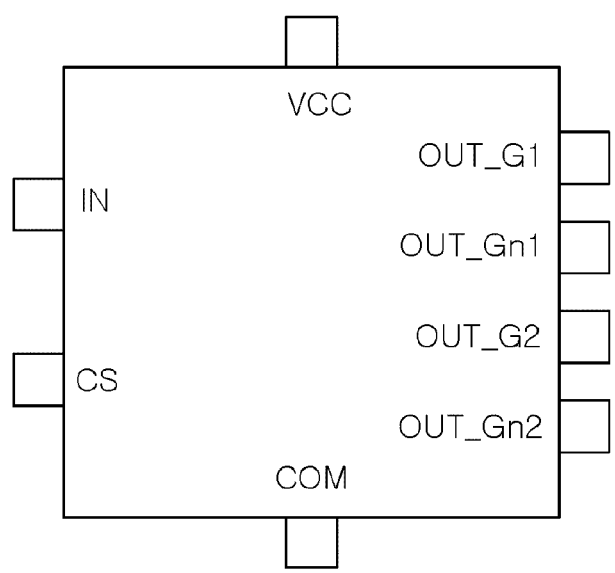
FIG. 8 is a view illustrating a driving apparatus according to another embodiment of the present invention.

FIG. 8 is a view illustrating a driving apparatus according to another embodiment of the present invention.

As described above, the controller 150 may provide the switching control signals G1, G2, Gn1, and Gn2 for controlling switching operations of the first main switch S1, the second main switch S2, the first auxiliary switch Sn1, and the second auxiliary switch Sn2.

The controller 150 may be implemented as a separate integrated circuit (IC). Also, the controller 150 may be implemented as a separate driving apparatus.

Here, for the purposes of description, a switching control signal for driving the first main switch S1 is defined as a first control signal G1. Also, a switching control signal for driving the second main switch S2 is defined as a third control signal G2. A switching control signal for driving the first auxiliary switch Sn1 is defined as a second control signal Gn1. Also, a switching control signal for driving the second auxiliary switch Sn2 is defined as a fourth control signal Gn2.

Referring to FIG. 8, the driving apparatus 200 may be implemented as an IC.

Also, the driving apparatus 200 may include an input unit IN obtaining an input signal, and a current sensing unit CS obtaining information regarding a current of a power factor correction circuit. Also, the driving apparatus 200 may include a first output unit OUT_G1 outputting a first control signal, a second output unit OUT_Gn1 outputting a second control signal, a third output unit OUT_G2 outputting a third control signal, and a fourth output unit OUT_Gn2 outputting a fourth control signal. Also, the driving apparatus 200 may include a terminal Vcc for receiving power and a terminal COM for a connection to the ground.

Figure 9:
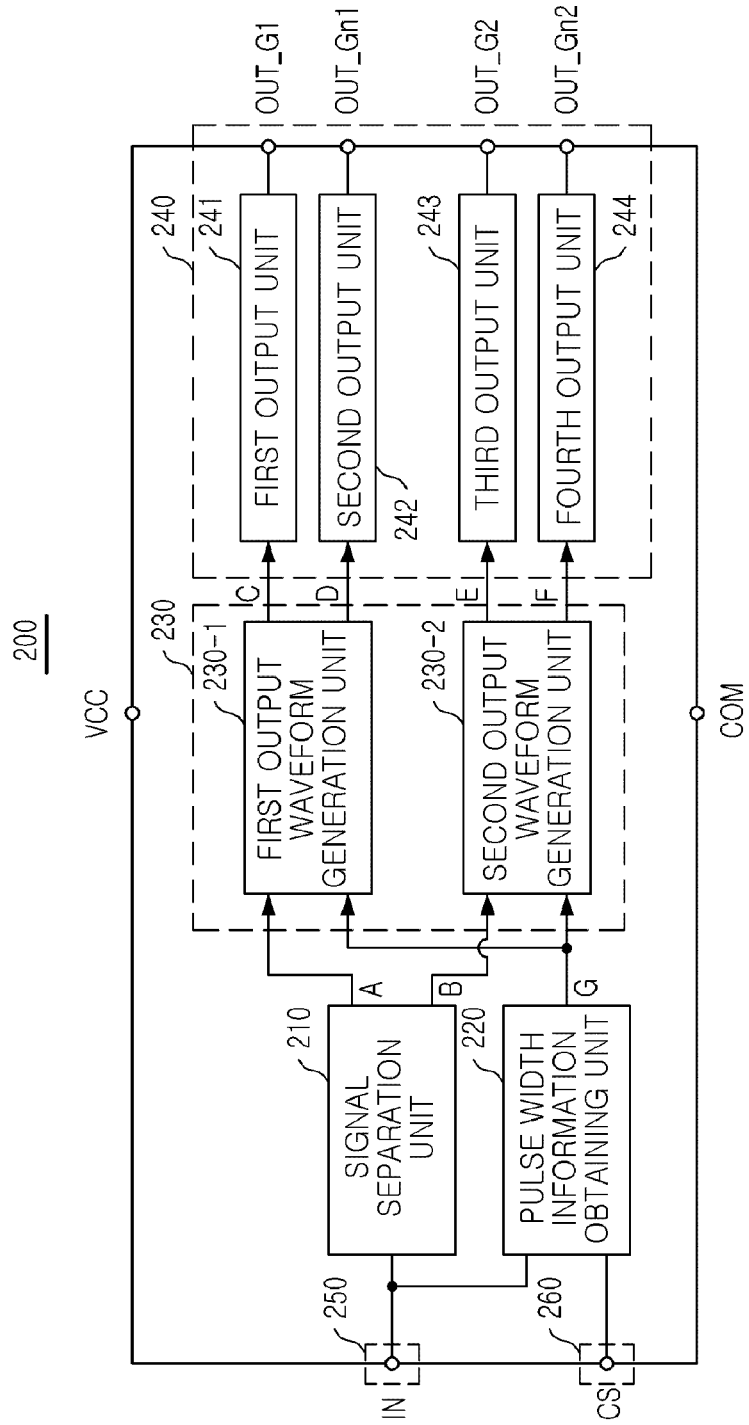
FIG. 9 is a block diagram of the driving apparatus according to another embodiment of the present invention.

FIG. 9 is a block diagram of the driving apparatus according to another embodiment of the present invention.

Referring to FIG. 9, the driving apparatus 200 may include an input unit 250, a current sensing unit 260, a signal separation unit 210, a pulse width information obtaining unit 220, an output waveform generation unit 230, and an output unit 240.

The input unit 250 may obtain an input signal. The input signal may be a pulse width modulation (PWM) signal.

The current sensing unit 260 may obtain information regarding a current of the interleaved power factor correction circuit. The current information may include an amount current flowing through the first diode D1 or the second diode D2 illustrated in FIG. 1. Here, the current flowing through the first diode D1 or the second diode D2 is defined as a load current.

Based on the input signal, the signal separation unit 210 may output a first internal signal A, the same as the input signal, and a second internal signal B having a phase delayed, relative to the first internal signal.

Figure 10:
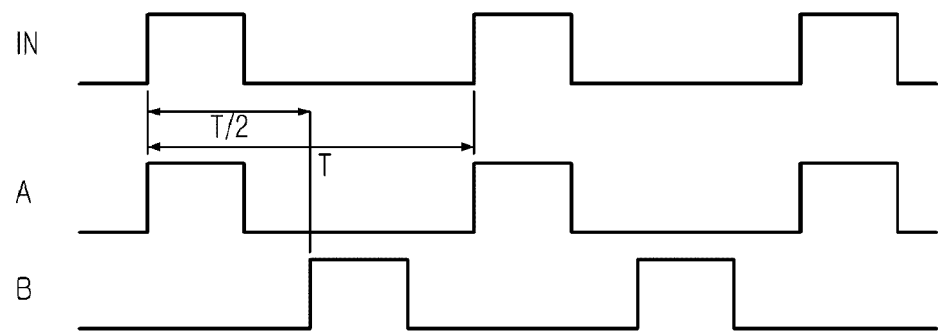
FIG. 10 is a view illustrating input and output waveforms of a signal separation unit.

FIG. 10 is a view illustrating input and output waveforms of a signal separation unit.

Referring to FIG. 10, the input signal IN may be a pulse width modulation signal. The signal separation unit 210 may obtain the input signal from the input unit 250, and based on the input signal IN, the signal separation unit 210 may output the first internal signal A, the same as the input signal, and the second internal signal B having a phase delayed, relative to the first internal signal.

In order to be applied to the 2-phase interleaved power factor correction circuit illustrated in FIG. 2, in a case in which a period of the input signal IN is T, the second internal signal B may be phase-delayed by T/2.

Figure 11:
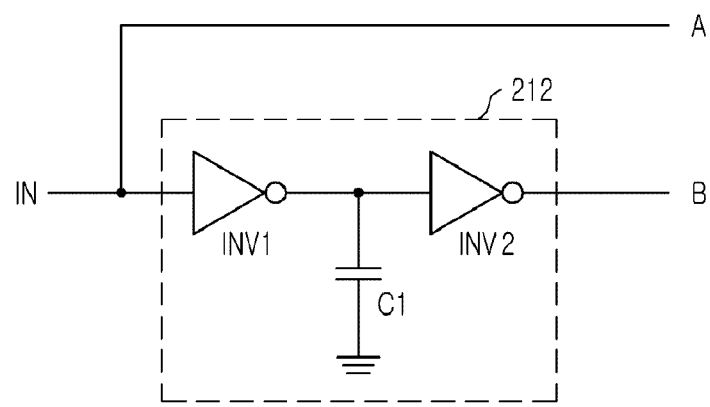
FIG. 11 is a view illustrating an example of an internal circuit of the signal separation unit.

FIG. 11 is a view illustrating an example of an internal circuit of the signal separation unit.

Referring to FIG. 11, the signal separation unit 210 may include a phase delay unit 212 delaying the input signal IN.

The phase delay unit 212 may include a plurality of inverter elements INV1 and INV2 connected in series. Also, a capacitor element C1 may be formed between a connection point between the inverter element INV1 and the inverter element INV2 and the ground.

The pulse width information obtaining unit 220 may obtain pulse width information based on the current information and the input signal.

Figure 12A:
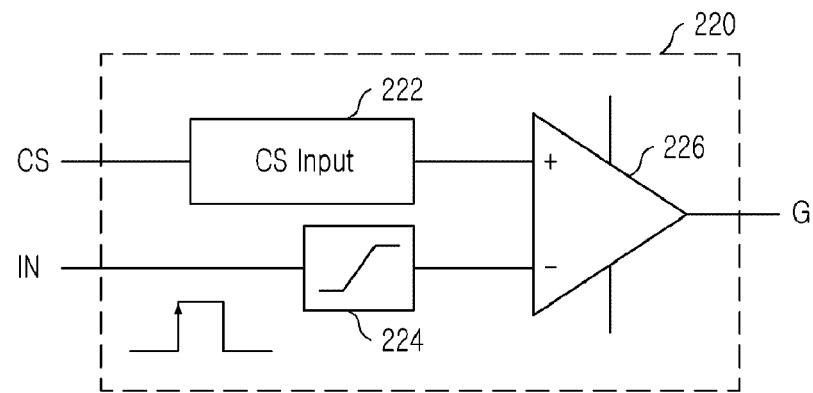
FIG. 12A is a view illustrating an example of a pulse width information obtaining unit and FIG. 12B is a view illustrating input and output waveforms of the pulse width information obtaining unit.
Figure 12B:
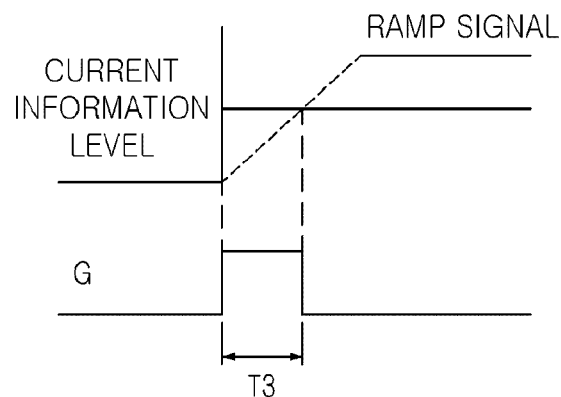

FIG. 12A is a view illustrating an example of a pulse width information obtaining unit and FIG. 12B is a view illustrating input and output waveforms of the pulse width information obtaining unit.

Referring to FIG. 12A, the pulse width information obtaining unit 220 may include a load current obtaining unit 222 obtaining a load current of the power factor correction circuit.

Also, the pulse width information obtaining unit 220 may include a ramp signal generation unit 224 generating a ramp signal based on the input signal. For example, the ramp signal generation unit 224 may generate a ramp signal from a point at which the input signal is turned on as a high level signal to a point at which the input signal is turned off as a low level signal. In this manner, the pulse width information obtaining unit 220 may generate a ramp signal based on the input signal.

Also, the pulse width information obtaining unit 220 may include a comparison unit 226 outputting a pulse width signal based on the received current information and the input information.

Referring to FIG. 12B, the comparison unit 226 may output a pulse signal G having a width from a point at which the ramp of the ramp signal starts to a point at which a current level included in the current information and the ramp signal intersect. The pulse signal G may include pulse width information.

Based on the first internal signal A, the second internal signal B, and the pulse signal G, the output waveform generation unit 230 may generate a third internal signal C with respect to the first main switch S1, a fourth internal signal D with respect to the first auxiliary switch Sn1, a fifth internal signal E with respect to the second main switch S2, and a sixth internal signal F with respect to the second auxiliary switch Sn2.

Meanwhile, the output waveform generation unit 230 may include a first output waveform generation unit 230-1 and a second output waveform generation unit 230-2.

The first output waveform generation unit 230-1 may generate the third internal signal C and the fourth internal signal D based on the first internal signal A and the pulse signal G.

The second output waveform generation unit 230-2 may generate the fifth internal signal E and the sixth internal signal F based on the second internal signal B and the pulse signal G.

Figure 13A:
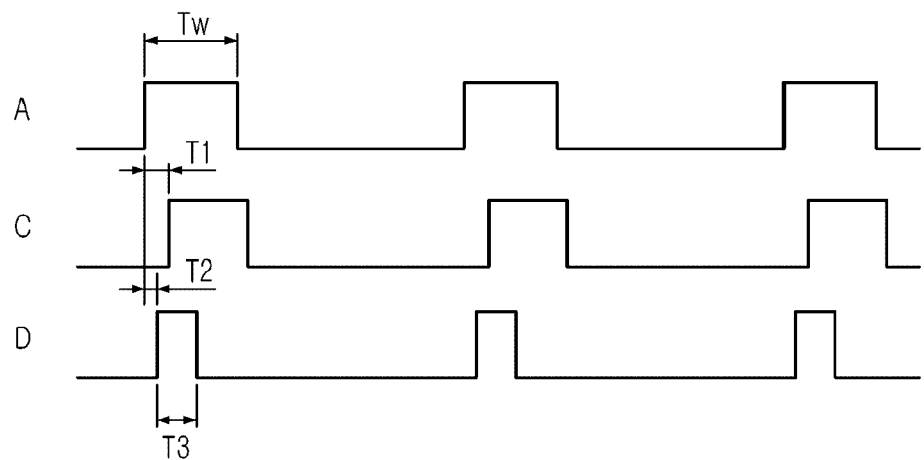
FIG. 13A is a view illustrating input and output waveforms of a first output waveform generation unit.

FIG. 13A is a view illustrating input and output waveforms of the first output waveform generation unit.

Referring to FIG. 13A, the first output waveform generation unit 230-1 may obtain the first internal signal A having an input pulse width Tw.

The first output waveform generation unit 230-1 may output the third internal signal C having a predetermined phase delayed from the first internal signal A. Here, a phase delay width of the third internal signal C is defined as T1.

Also, the first output waveform generation unit 230-1 may output the fourth internal signal D having a predetermined phase delayed from the first internal signal A and having the same pulse width as that of the pulse signal G. Here, a phase delay width of the fourth internal signal D is defined as T2. Also, a pulse width of the fourth internal signal D is defined as T3.

Here, the phase delay width T1 of the third internal signal C may be greater than the phase delay width T2 of the fourth internal signal D. Also, the pulse width T3 of the fourth internal signal D may be narrower than a pulse width Tw of the first internal signal A.

Figure 13B:
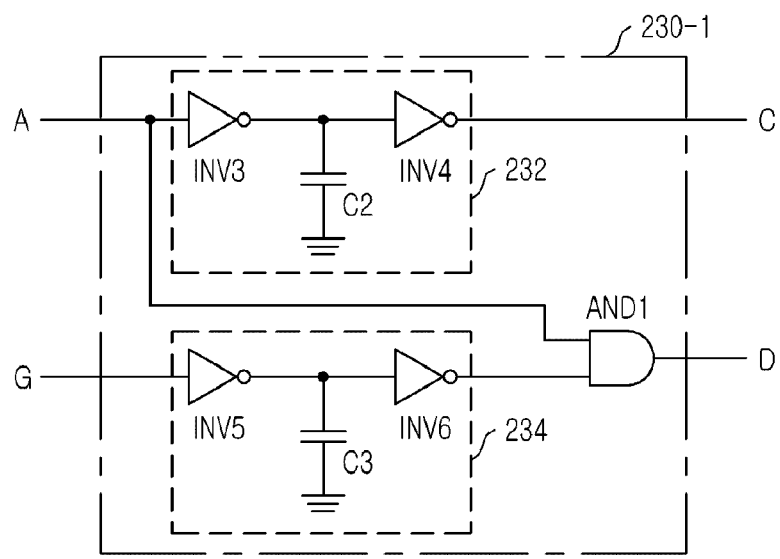
FIG. 13B is a view illustrating an example of an internal circuit of the first output waveform generation unit.

FIG. 13B is a view illustrating an example of an internal circuit of the first output waveform generation unit.

Referring to FIG. 13B, the first output waveform generation unit 230-1 may include a phase retardation unit 232 retarding the first internal signal A.

The phase retardation unit 232 may include a plurality of inverter elements INV3 and INV4 connected in series. Also, a capacitor element C2 may be formed between a connection point between the inverter element INV3 and the inverter element INV4 and the ground.

Thus, the phase retardation unit 232 may output the third internal signal C having a phase delayed, relative to the first internal signal A.

Also, the first output waveform generation unit 230-1 may include a phase retardation unit 234 retarding the pulse signal G.

The phase retardation unit 234 may include a plurality of inverter elements INV5 and INV6 connected in series. Also, a capacitor element C3 may be formed between a connection point between the inverter element INV5 and the inverter element INV6 and the ground.

Thus, the phase delay unit 234 may output a signal having a phase delayed, relative to the pulse signal G.

Meanwhile, the first output waveform generation unit 230-1 may include an AND gate element AND1. The AND gate element AND1 may output the fourth internal signal D based on the first internal signal A and an output signal from the phase retardation unit 234.

Namely, referring to FIGS. 13A and 13B, the first output waveform generation unit 230-1 may generate the third internal signal C and the fourth internal signal D based on the first internal signal A and the pulse signal G.

Meanwhile, in the interleaved power factor correction circuit illustrated in FIG. 1, in a case in which a load current is increased, the pulse with of the control signal Gn1 is preferred to be widened in order to reduce a spike voltage generated when the first auxiliary switch Sn1 is turned off. The reason is because, when the pulse width of the control signal Gn1 is widened, a current flowing at a point at which the first auxiliary switch Sn1 is turned off can be reduced.

Here, the pulse width of the control signal Gn1 may be determined based on the width T3 of the fourth internal signal D. Thus, in this case, it is preferred for the width T3 of the fourth internal signal D to be widened.

In an embodiment of the present invention, the pulse width of the fourth internal signal D may be determined based on the load current. For example, the pulse width of the fourth internal signal D may be proportional to the load current.

Namely, as the load current is increased, the pulse width of the pulse signal G may be widened.

Meanwhile, the second output waveform generation unit 230-2 may be driven in the manner as described above, so a detailed description of the second output waveform generation unit 230-2 will be omitted.

The output unit 240 may output a first control signal for controlling the first main switch S1, a second control signal for controlling the first auxiliary switch Sn1, a third control signal for controlling the second main switch S2, and a fourth control signal for controlling the second auxiliary switch Sn2 based on the input signal and the current information.

Also, the output unit 240 may regulate output levels of the third internal signal C, the fourth internal signal D, the fifth internal signal E, and the sixth internal signal F.

For example, the output unit 240 may convert the third to sixth internal signals C, D, E, and F having a logic level (5V), as output signals from the output waveform generation unit 230, into signals having a voltage level (e.g., 15V) required for driving an actual power semiconductor switch.

In detail, the output unit 240 may include a first output unit 241, a second output unit 242, a third output unit 243, and a fourth output unit 244.

The first output unit 241 may regulate a level of the third internal signal C to output the first control signal.

The second output unit 242 may regulate a level of the fourth internal signal D to output the second control signal.

The third output unit 243 may regulate a level of the fifth internal signal E to output the third control signal.

The fourth output unit 244 may regulate a level of the sixth internal signal F to output the fourth control signal.

Figure 14:
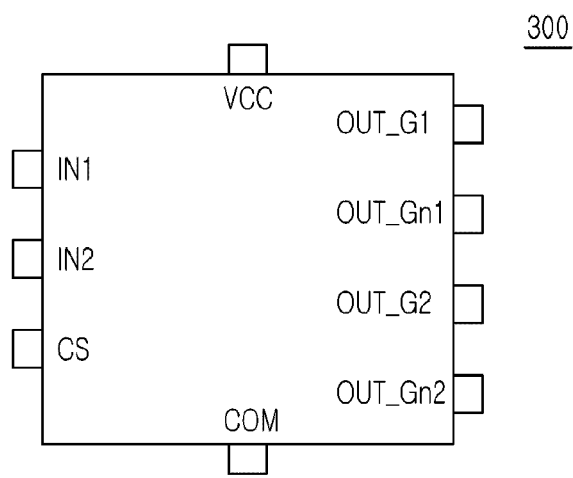
FIG. 14 is a view illustrating a driving apparatus according to another embodiment of the present invention.

FIG. 14 is a view illustrating a driving apparatus according to another embodiment of the present invention.

As discussed above, the controller 150 may provide the switching control signals G1, G2, Gn1, and Gn2 for controlling switching operations of the first main switch S1, the second main switch S2, the first auxiliary switch Sn1, and the second auxiliary switch Sn2.

Referring to FIG. 14, the driving apparatus 300 may be implemented as an IC.

Also, the driving apparatus 300 may include a first input unit IN1 obtaining a first input signal, a second input unit IN2 obtaining a second input signal, a current sensing unit CS obtaining information regarding a current of a power factor correction circuit. Also, the driving apparatus 300 may include a first output unit OUT_G1 outputting a first control signal, a second output unit OUT_Gn1 outputting a second control signal, a third output unit OUT_G2 outputting a third control signal, and a fourth output unit OUT_Gn2 outputting a fourth control signal. Also, the driving apparatus 300 may include a terminal Vcc for receiving power and a terminal COM for a connection to the ground.

Figure 15:
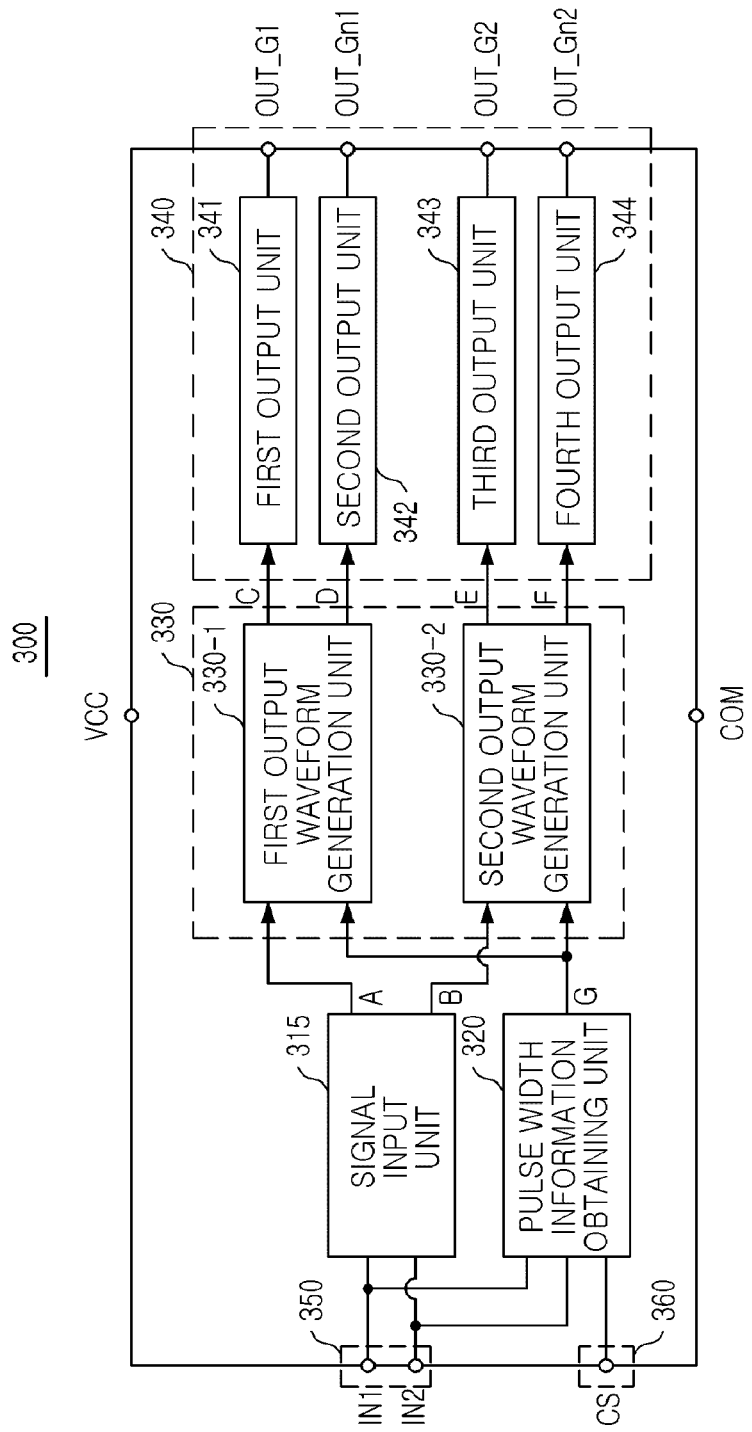
FIG. 15 is a block diagram of the driving apparatus according to another embodiment of the present invention.

FIG. 15 is a block diagram of the driving apparatus according to another embodiment of the present invention.

Referring to FIG. 15, the driving apparatus 300 may include an input unit 350, a current sensing unit 360, a signal input unit 315, a pulse width information obtaining unit 320, an output waveform generation unit 330, and an output unit 340.

The input unit 350 may obtain a first input signal and a second input signal.

Here, the second input signal may have a phase delayed, relative to the first input signal.

In order to be applied to the 2-phase interleaved power factor correction circuit illustrated in FIG. 1, the second input signal may have a phase delayed by 180 degrees, relative to the first input signal.

The signal input unit 315 may regulate the first input signal and the second input signal to have an internal control signal level and output the same.

Meanwhile, the pulse width information obtaining unit may obtain pulse width information based on at least one of the current information, the first input signal, and the second input signal.

Here, the current sensing unit 360, the pulse width information obtaining unit 320, the output waveform generation unit 330, and the output unit 340 operate as described above, so a detailed description thereof will be omitted.

When the power factor correction circuit is driven by the driving apparatus according to an embodiment of the present invention, the first main switch S1 and the second main switch S2 can be soft-switched, so a change in a current and a voltage in the event of switching can be remarkably reduced. Thus, for this reason, electromagnetic interference (EMI) noise can be reduced.

Heretofore, the driving apparatus for driving the 2-phase interleaved power factor correction circuit has been described. The foregoing content may also be applied to a driving apparatus for driving an N-phase interleaved power factor correction circuit.

Figure 16:
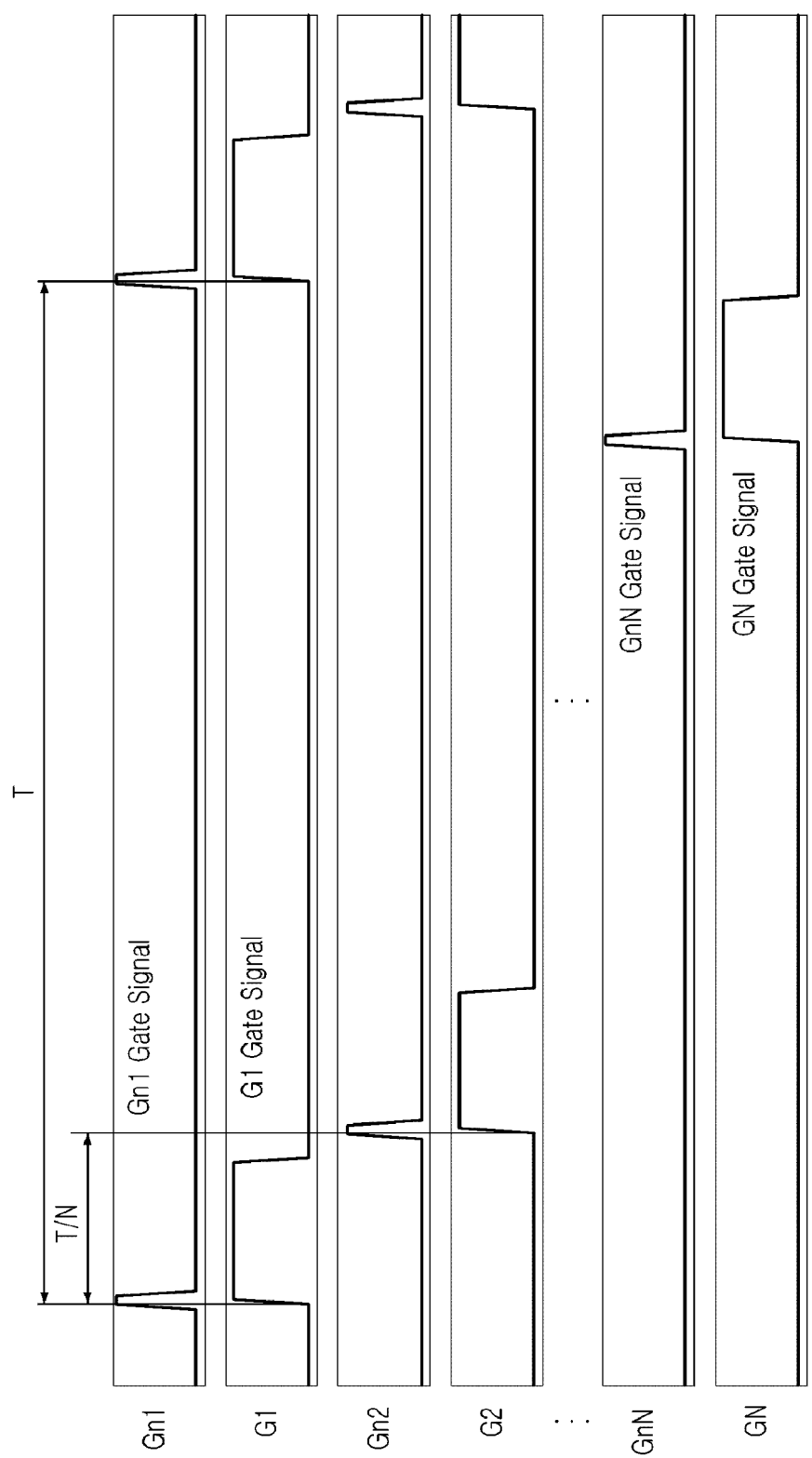
FIG. 16 is a view illustrating signal waveforms for driving an N-phase interleaved power factor correction circuit.

FIG. 16 is a view illustrating signal waveforms for driving an N-phase interleaved power factor correction circuit (here, N is a natural number).

Referring to FIG. 16, gate signals Gn of an auxiliary switch and gate signals G of a main switch may be phase-delayed with a time difference obtained by dividing an overall switching period T by N, respectively.

In this manner, the N-phase interleaved power factor correction circuit may be driven. Meanwhile, ripple of the entire input currents can be minimized accordingly.

As set forth above, according to embodiments of the invention, the driving apparatus for driving the interleaved power factor correction circuit capable of reducing switching loss generated in the event of power factor correction switching by delivering surplus power to the ground before a switching operation for power factor correction is performed, can be provided.

Also, the driving apparatus for driving the interleaved power factor correction circuit capable of reducing an electromagnetic interference (EMI) noise level can be provided.

While the present invention has been shown and described in connection with the embodiments, it will be apparent to those skilled in the art that modifications and variations can be made without departing from the spirit and scope of the invention as defined by the appended claims.

What is claimed is:

1. A driving apparatus for driving an interleaved power factor correction circuit including a first main switch and a second main switch performing a switching operation with a predetermined phase difference, a first auxiliary switch performing a first switching operation of being turned on before the first main switch is turned on, and turned off before the first main switch is turned off, and a second auxiliary switch performing a second switching operation of being turned on before the second main switch is turned on, and turned off before the second main switch is turned off and a first inductor connected between an input power terminal to which input power is applied and the first main switch and a second inductor connected between the input power terminal and the second main switch, wherein a first current from the first inductor can flow to the first main or auxiliary switch and a second current from the second inductor can flow to the second main or auxiliary switch wherein the first auxiliary switch performs a switching operation of being turned on at a time at which the second switching operation is terminated, and the second auxiliary switch performs a switching operation of being turned on at a time at which the first switching operation is terminated, the apparatus comprising:
    an input unit obtaining an input signal;
    a current sensing unit obtaining information regarding a current of the interleaved power factor correction circuit; and
    an output unit outputting a first control signal with respect to the first main switch, a third control signal with respect to the second main switch, a second control signal with respect to the first auxiliary switch, and a fourth control signal with respect to the second auxiliary switch, based on the input signal and the current information.

2. The driving apparatus of claim 1, further comprising: a signal separation unit outputting a first internal signal, the same as the input signal, and a second internal signal having a phase delayed, relative to the first internal signal, based on the input signal.

3. The driving apparatus of claim 2, further comprising: a pulse width information obtaining unit obtaining pulse width information based on the current information and the input signal.

4. The driving apparatus of claim 3, further comprising: an output waveform generation unit generating a third internal signal with respect to the first main switch, a fourth internal signal with respect to the first auxiliary switch, a fifth internal signal with respect to the second main switch, and a sixth internal signal with respect to the second auxiliary switch, based on the first internal signal, the second internal signal, and the pulse width information.

5. The driving apparatus of claim 4, wherein the output waveform generation unit comprises:

a first output waveform generation unit generating the third internal signal and the fourth internal signal based on the first internal signal and the pulse width information; and a second output waveform generation unit generating the fifth internal signal and the sixth internal signal based on the second internal signal and the pulse width information.

6. The driving apparatus of claim 5, wherein the output unit regulates an output level of the third internal signal, the fourth internal signal, the fifth internal signal, and the sixth internal signal.

7. The driving apparatus of claim 6, wherein the output unit comprises:

a first output unit regulating a level of the third internal signal to output a first control signal;

a second output unit regulating a level of the fourth internal signal to output a second control signal;

a third output unit regulating a level of the fifth internal signal to output a third control signal; and a fourth output unit regulating a level of the sixth internal signal to output a fourth control signal.

8. The driving apparatus of claim 3, wherein the pulse width information obtaining unit obtains a load current of the power factor correction circuit, generates a ramp signal based on the input signal, and obtains pulse width information based on the load current and the ramp signal.

9. The driving apparatus of claim 2, wherein the signal separation unit comprises a phase retardation unit retarding the input signal.

10. The driving apparatus of claim 9, wherein the phase retardation unit comprises a plurality of inverter elements connected in series.

11. The driving apparatus of claim 1, wherein the input signal is a pulse width modulation (PWM) signal.

12. A driving apparatus for driving an interleaved power factor correction circuit including a first main switch and a second main switch performing a switching operation with a predetermined phase difference, a first auxiliary switch performing a first switching operation of being turned on before the first main switch is turned on, and turned off before the first main switch is turned off, and a second auxiliary switch performing a second switching operation of being turned on before the second main switch is turned on, and turned off before the second main switch is turned off and a first inductor connected between an input power terminal to which input power is applied and the first main switch and a second inductor connected between the input power terminal and the second main switch, wherein a first current from the first inductor can flow to the first main or auxiliary switch and a second current from the second inductor can flow to the second main or auxiliary switch wherein the first auxiliary switch performs a switching operation of being turned on at a time at which the second switching operation is terminated, and the second auxiliary switch performs a switching operation of being turned on at a time at which the first switching operation is terminated, the apparatus comprising:

an input unit obtaining a first input signal and a second input signal;

a current sensing unit obtaining information regarding a current of the interleaved power factor correction circuit; and an output unit outputting a first control signal with respect to the first main switch, a third control signal with respect to the second main switch, a second control signal with respect to the first auxiliary switch, and a fourth control signal with respect to the second auxiliary switch, based on the first input signal, the second input signal, and the current information.

13. The driving apparatus of claim 12, further comprising:

a signal input unit regulating the first input signal and the second input signal to have an internal control signal level.

* * * * *